(12) United States Patent
Georgis

(10) Patent No.: US 8,408,120 B2
(45) Date of Patent: Apr. 2, 2013

(54) VERTICAL ROTISSERIE BROILER

(75) Inventor: John D. Georgis, Palos Park, IL (US)

(73) Assignee: Optimal Automatics Incorporated, Elk Grove Village, IL (US)

( * ) Notice: Subject to any disclaimer, the term of this patent is extended or adjusted under 35 U.S.C. 154(b) by 958 days.

(21) Appl. No.: 12/322,726

(22) Filed: Feb. 6, 2009

(65) Prior Publication Data

US 2010/0199855 A1    Aug. 12, 2010

(51) Int. Cl.
*A47J 37/04*     (2006.01)

(52) U.S. Cl. ..... 99/421 V; 99/419; 99/421 M; 99/421 P; 99/421 R

(58) Field of Classification Search ................ 99/421 V, 99/421 R, 421 M, 421 P, 419
See application file for complete search history.

(56) References Cited

U.S. PATENT DOCUMENTS

| | | | | |
|---|---|---|---|---|
| 1,719,713 A | * | 7/1929 | Miller | 99/346 |
| 2,179,646 A | * | 11/1939 | Spartalis | 99/421 P |
| 2,482,601 A | * | 9/1949 | Spartalis | 99/421 R |
| 2,549,019 A | * | 4/1951 | Saunders | 99/421 P |
| 2,581,570 A | * | 1/1952 | Amanatides | 99/421 V |
| 2,687,080 A | * | 8/1954 | Dorin | 99/339 |
| 3,153,436 A | * | 10/1964 | Chesley | 99/538 |
| 3,604,341 A | * | 9/1971 | Coroneos | 99/421 V |
| 3,817,164 A | * | 6/1974 | Hintze | 99/421 V |
| 3,956,979 A | * | 5/1976 | Coroneos | 99/421 V |
| D245,566 S | | 8/1977 | Tomaras | |
| 4,170,174 A | * | 10/1979 | Ditty et al. | 99/538 |
| 4,211,159 A | * | 7/1980 | Coatu | 99/421 V |
| 4,270,444 A | * | 6/1981 | Geissmann | 99/421 V |
| 4,300,443 A | * | 11/1981 | Morcos et al. | 99/332 |
| 4,386,560 A | * | 6/1983 | Ditty | 99/538 |
| 4,512,248 A | * | 4/1985 | Volakakis | 99/341 |
| 4,744,130 A | | 5/1988 | Epstein et al. | |
| 4,787,302 A | * | 11/1988 | Waltman et al. | 99/427 |
| 4,925,032 A | | 5/1990 | Liles | |
| 4,979,439 A | | 12/1990 | Ferron-Zepeda | |
| 5,101,715 A | * | 4/1992 | Liu | 99/421 V |
| 5,251,543 A | * | 10/1993 | Brothers | 99/538 |
| 5,357,853 A | * | 10/1994 | Nelson et al. | 99/538 |
| 5,429,042 A | | 7/1995 | Koopman | |
| 5,575,196 A | * | 11/1996 | Masel et al. | 99/421 V |
| 5,665,258 A | * | 9/1997 | Hsu | 219/388 |
| D391,799 S | | 3/1998 | Haring et al. | |
| 5,801,362 A | * | 9/1998 | Pearlman et al. | 219/400 |
| 5,845,563 A | * | 12/1998 | Haring et al. | 99/419 |
| 5,910,332 A | | 6/1999 | Fakieh | |
| 6,047,633 A | * | 4/2000 | Khaytman | 99/421 V |
| 6,269,740 B2 | * | 8/2001 | Kojs | 99/537 |
| 6,272,975 B1 | | 8/2001 | Usherovich | |
| 6,279,465 B1 | | 8/2001 | English | |
| 6,484,627 B1 | * | 11/2002 | Peter | 99/538 |
| 6,550,373 B2 | | 4/2003 | Hafezan et al. | |

(Continued)

*Primary Examiner* — Alvin Hunter
*Assistant Examiner* — Alexander Niconovich
(74) *Attorney, Agent, or Firm* — McDermott Will & Emery LLP

(57) ABSTRACT

A generally vertically disposed rotisserie broiler. The broiler includes a metal housing with side walls, a floor, and an open end. One or more burners are disposed on opposite side walls of the housing. A generally vertically disposed spit is normally contained within the confines of the metal housing, but is movable towards the open end of the housing. The spit is rotated by a motor. The rotisserie broiler also includes an upper generally horizontal arm, and a lower generally horizontal arm, positioned adjacent an upper end and a lower end of the spit, respectively, for moving the spit transversely within the housing.

11 Claims, 5 Drawing Sheets

U.S. PATENT DOCUMENTS

| | | |
|---|---|---|
| 6,568,315 B2 | 5/2003 | Backus et al. |
| 6,582,744 B1 * | 6/2003 | Babacan ........................ 426/513 |
| 6,595,119 B1 | 7/2003 | Cheung |
| 6,782,805 B2 | 8/2004 | Backus et al. |
| 6,782,806 B2 | 8/2004 | Backus et al. |
| 6,837,149 B1 * | 1/2005 | Tsontakis ........................ 99/339 |
| 6,837,150 B2 * | 1/2005 | Backus et al. .............. 99/421 H |
| 6,874,408 B2 * | 4/2005 | Backus et al. ................... 99/327 |
| 7,000,529 B2 | 2/2006 | Sculuca |
| 7,060,942 B2 * | 6/2006 | Friedl et al. .................... 219/411 |
| 7,225,730 B2 * | 6/2007 | Backus et al. ................... 99/419 |
| 7,241,977 B2 * | 7/2007 | Friedl et al. .................... 219/411 |
| 7,628,105 B2 * | 12/2009 | Umit et al. ....................... 99/419 |

* cited by examiner

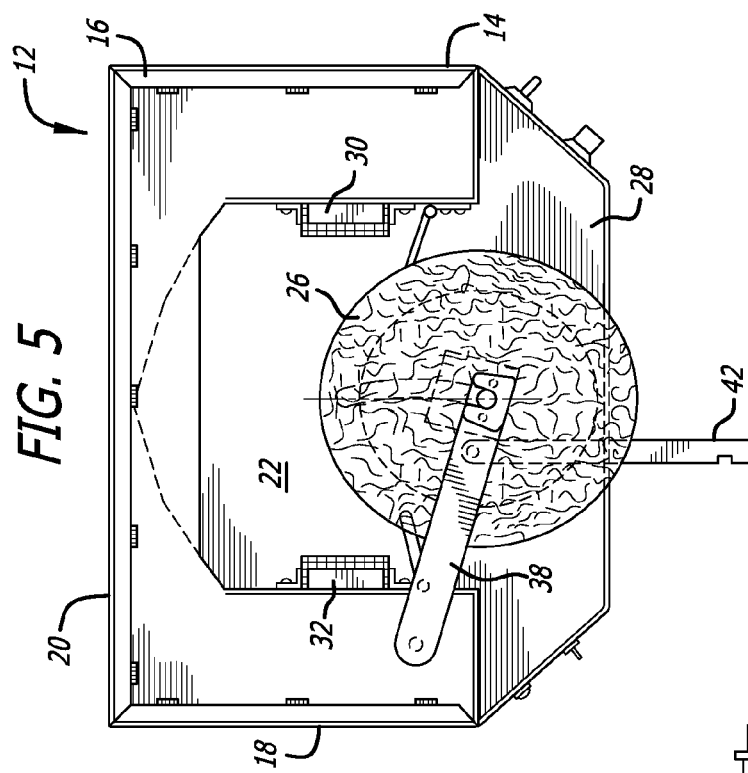
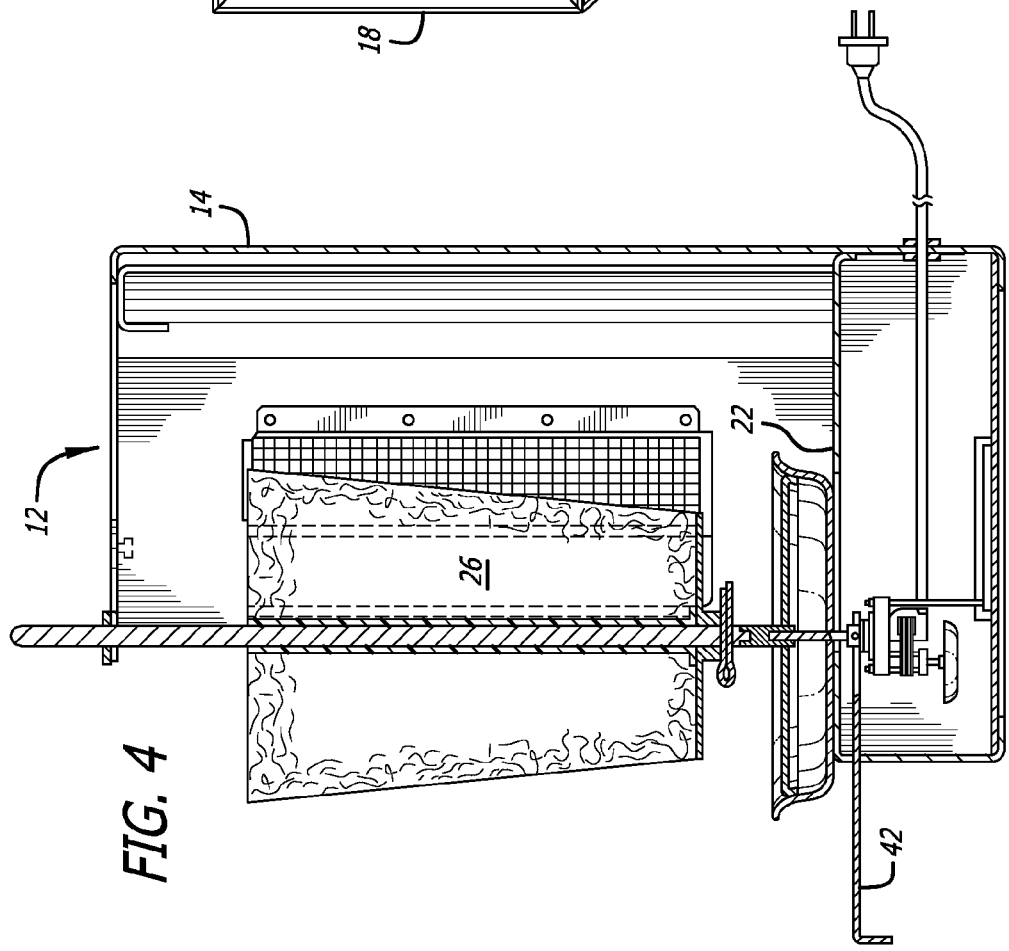

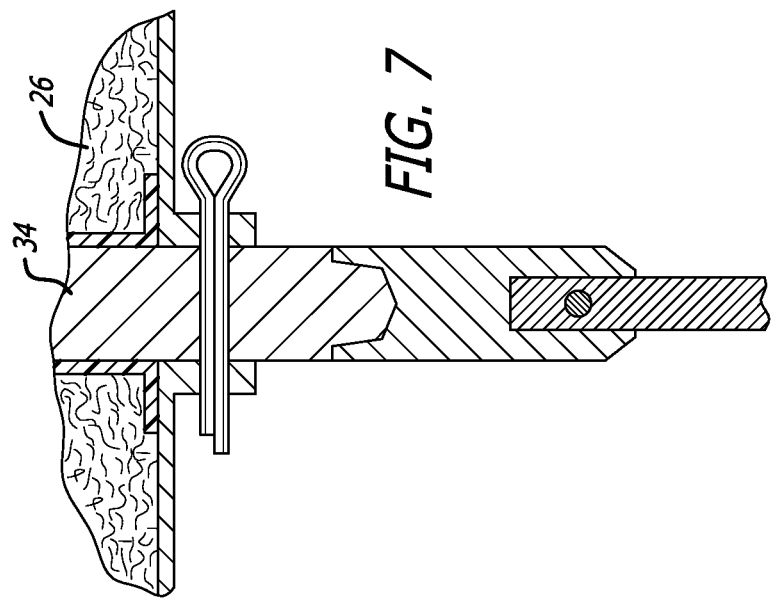
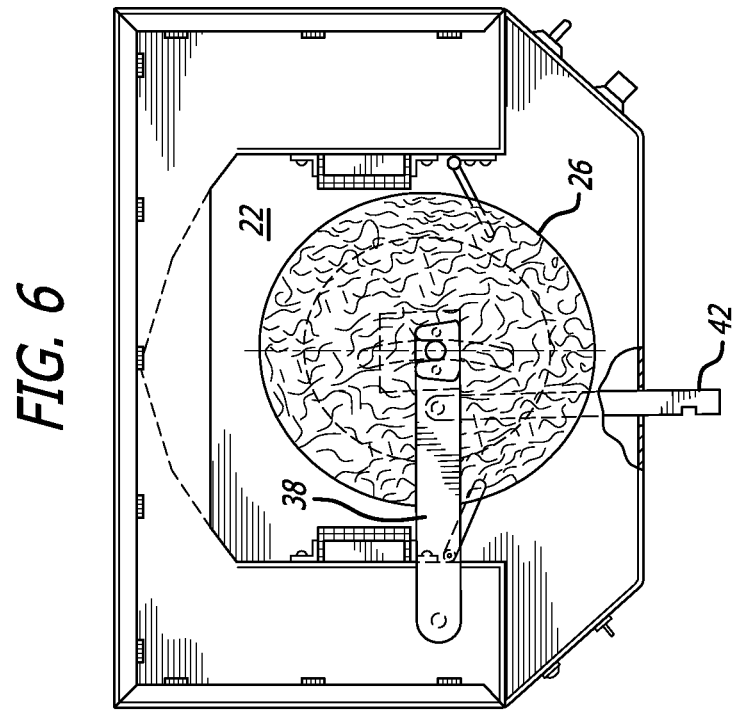

VERTICAL ROTISSERIE BROILER

CROSS-REFERENCE TO RELATED APPLICATIONS

None.

FEDERALLY SPONSORED RESEARCH OR DEVELOPMENT

Not Applicable.

TECHNICAL FIELD

This invention is directed to a vertical rotisserie broiler for use in connection with the preparation of foods, such as gyros meat. In particular, the invention is directed to a vertical rotisserie broiler with an improved means of moving a bulk, cone-shaped meat product towards and away from the heating elements that are a part of that broiler.

BACKGROUND OF THE INVENTION

Gyros and similar cone-shaped meat products, and the vertical rotisserie broilers used to cook such meat products, are well-known in the art. Such rotisserie broilers are typically constructed of a metal housing with an open end; two or more electric- or gas-powered burners, disposed on opposite sides of the housing; a vertical spit within the confines of the metal housing, for holding the meat to be cooked; and a motor for rotating the spit, to ensure even cooking of the meat.

After the gyros or other cone-shaped meat has been cooked, it is typically sliced off of the cone by the user. This creates some potential safety issues, as the burners used in vertical rotisserie broilers can reach 800° F. or more. This heat is adequate to cause second degree burns on a user who finds his hands or arms unacceptably close to those burners.

Prior art vertical rotisserie broilers known to the applicant have no provisions for moving the spit outwardly. Instead, some prior art broilers of this general type include means for moving the spit inwardly, i.e., away from the opening of the housing and towards a burner that is typically positioned near the back wall. Preferably, to the extent possible, the gyros cone should be positioned at a uniform distance from the burner. In order to ensure this, such prior art broilers include provisions for moving the spit towards the burner so as to move the gyros cone closer to that burner. In this way, these prior art broilers can accommodate gyros cones that are of various sizes, or gyros cones that are initially large in diameter, but become smaller in diameter as they are progressively cut and served.

Typical prior art vertical and other rotisserie broilers include those shown and described in U.S. Pat. Nos. 4,512, 248; 4,979,439; 5,910,332; U.S. Pat. No. Des 245,566; and many of the other patents disclosed and cited in these four patents.

SUMMARY OF THE INVENTION

The invention is a generally vertically disposed rotisserie broiler. The broiler comprises a housing made of a metal or other suitable material.

In general, the housing includes side walls, a floor, and an open end. The housing also includes one or more electric or gas powered burners. These burners are typically disposed on opposite side walls of the housing, so as to ensure even cooking of the meat that is to be cooked in the rotisserie broiler.

A generally vertically disposed spit is used to hold the meat during cooking. During such cooking, this spit is normally contained within the confines of the metal housing.

A motor, typically powered by household alternating electric current, is used for rotating the spit.

The invention further includes means (a) for maintaining the spit in a generally vertical configuration, and (b) for moving the entire spit transversely, and towards the open end of the metal housing.

In the most preferred embodiment of the invention, this means comprises an upper, generally horizontal arm and a lower, generally horizontal arm.

As the spit is moved transversely, it moves along a generally radially extending path. This generally radially extending path is defined along the floor of the metal housing While the preferred embodiment includes two burners, the rotisserie of the invention can include one or more burners. The burners may be either gas- or electric-powered.

The upper and lower generally horizontal arms are each connected to the spit, either directly or indirectly. In the most preferred embodiment, a lever is secured to the lower generally horizontal arm. This lever is movable between one of two positions, and effects movement of the spit.

For example, when the lever is in its first, cooking position, the spit is fully enclosed within the housing.

In contrast, when the lever is in its second, cutting position, the spit is moved towards the opening of the housing, and most preferably to a position outside of the confines of the housing.

There is preferably an arcuate slot in the floor of the metal housing. The spit moves through this slot, and specifically moves between its first cooking position and its second cutting position.

Other aspects of the invention will be apparent from a review of the below drawings, the descriptions of the drawings, and the descriptions of one of the preferred embodiments.

BRIEF DESCRIPTION OF THE DRAWINGS

FIG. 4 is a right side, partially sectional view of the vertical rotisserie broiler of FIG. 1, and with the spit in its removed (for meat cutting) position.

FIG. 5 is a top view of the vertical rotisserie broiler of FIG. 4.

FIG. 6 is top view of the vertical rotisserie broiler of FIG. 1, but with the spit in an intermediate position, i.e., disposed between its position of FIG. 3 and its position of FIG. 5.

FIG. 7 is an enlarged view of a cotter pin used to adjust the height of the meat base upon the spit.

DETAILED DESCRIPTION

There are many possible embodiments of this invention. The drawings and description below describe in detail a preferred embodiment of the invention. It should be understood that the present disclosure is to be considered as an example of the principles of the invention. The disclosure is not intended to limit the broad aspect of the invention to the embodiments illustrated.

Figure 1:
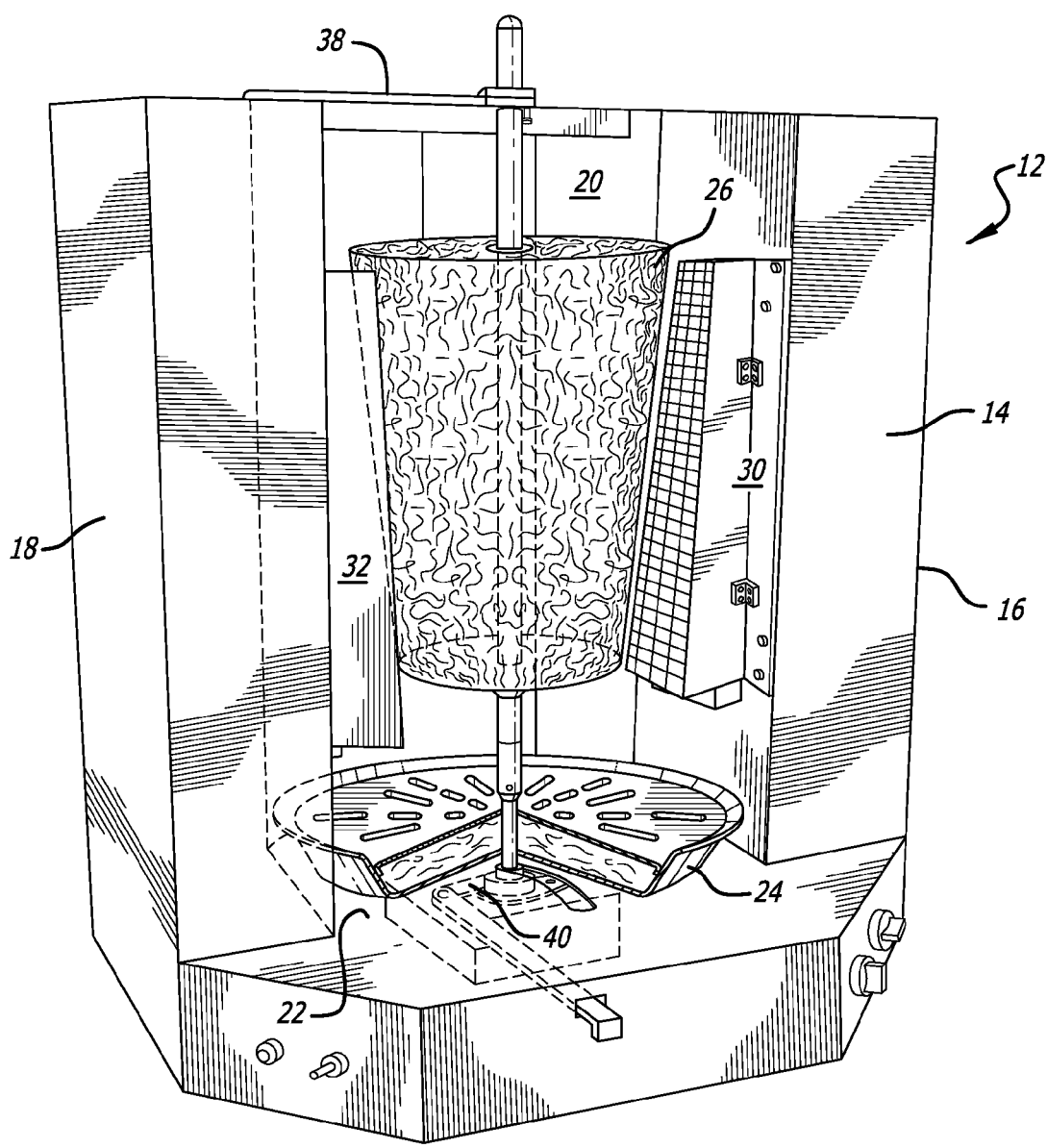
FIG. 1 is a perspective view of the vertical rotisserie broiler in accordance with the invention.

As may best be seen in FIG. 1, the invention is a generally vertically disposed rotisserie broiler 12. The broiler 12 is in many respects similar to those known in the prior art.

For example, like those prior art rotisserie broilers, the broiler 12 of the present invention comprises a housing 14. This housing 14 provides the main structural support for the various functional components of the broiler 12. Thus, the housing 14 should be made of a structurally rigid and sound material, such as a metal or other suitable material. The most preferred metals for the housing 14 include either aluminum or stainless steel.

In general, as may further be seen in FIG. 1, the housing 14 includes side walls 16 and 18, and a back wall 20.

The housing 14 also includes a floor 22. The floor 22 holds a drip pan 24, to catch any juices that fall from the gyros cone 26, or other suitable foods, during cooking.

Figure 3:
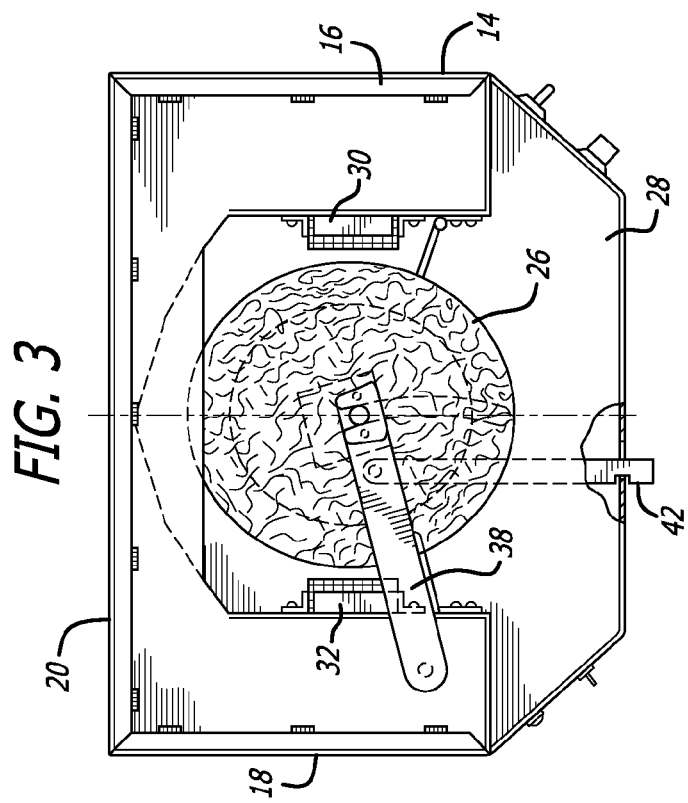
FIG. 3 is a top view of the vertical rotisserie broiler of FIG. 2.

As may be seen in FIG. 1, and in the overhead views of FIGS. 3 and 5, the side wall 16, side wall 18, and back wall 20 of the housing 14 enclose approximately three-fourths of the circumference of the housing 14. The remaining one-fourth of the circumference is an open end 28, permitting the user to obtain access to the interior of the housing 14.

As noted above, the housing 14 supports the various components of the rotisserie broiler 12. For example, the broiler 12 includes one or more gas- or electric-powered burner, for cooking the meat being processed by the broiler 12. In this embodiment, as may best be seen in FIGS. 1, 3, and 5, a pair of electric burners 30 and 32 provide the cooking heat for the meats to be processed.

These burners 30 and 32 are typically disposed on the opposite side walls 16 and 18, respectively, of the housing 14. Multiple burners increase the evenness of the cooking of the meat 26 by the rotisserie broiler 12.

That meat, whether a gyros cone 26 or other similar food product, is held during the cooking by a generally vertically disposed spit 34. The spit 34 typically includes tines (not shown) that grip and hold the gyros cone 26 during the cooking process. The spit 34 uses an electric motor 36 positioned below the floor 22 of the housing 14 to rotate the gyros cone 26. The motor 36 is typically powered by 120 volt household alternating electric current.

Figure 2:
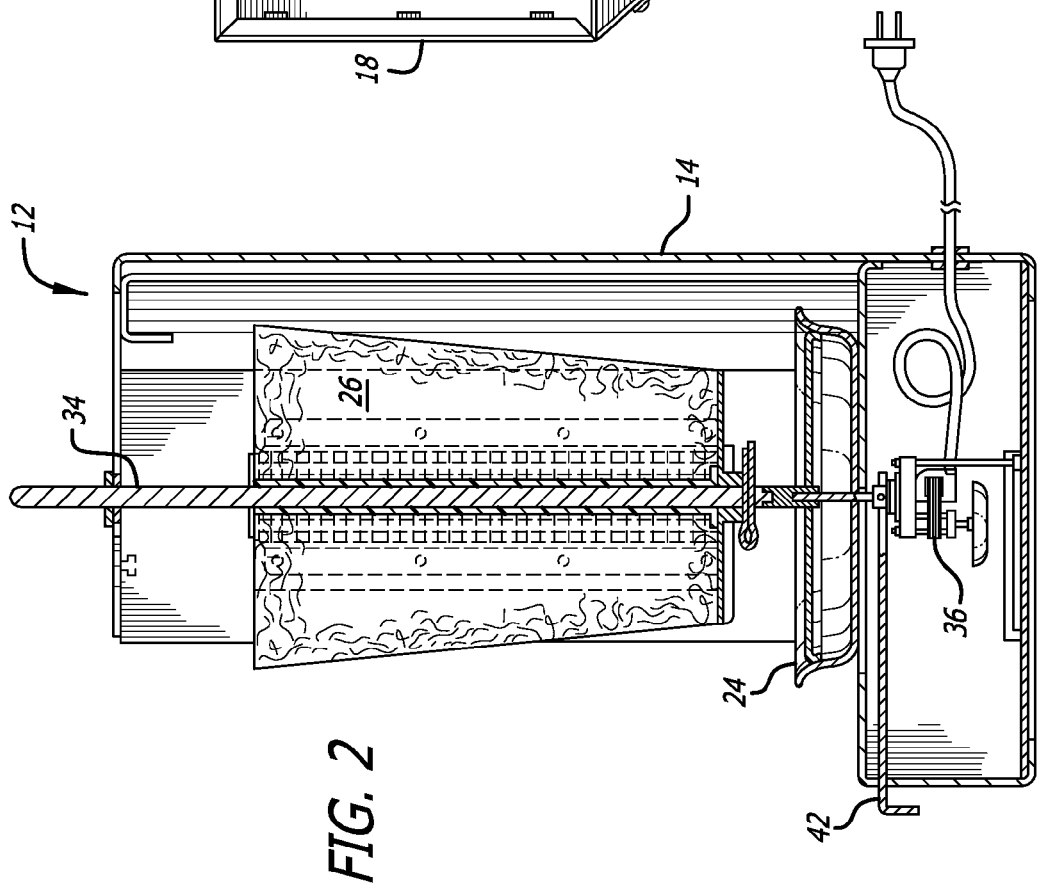
FIG. 2 is a right side, partially sectional view of the vertical rotisserie broiler of FIG. 1, and with the spit in its normal (for meat cooking) position.

As may be seen in FIGS. 1-3, during such cooking, this spit 34 is normally contained within the confines of the metal housing 14. The gyros cone 26 is thus positioned close to the burners 30 and 32, ensuring most efficient use of the heat of those burners.

Conventional rotisseries have fixed, non-movable spits. Alternatively, conventional rotisseries have spits that move only inwardly, so that the gyros cone can be moved away from the user, and towards a burner positioned on the back wall of the housing. This only helps in placing the gyros cone closer to the burners, and in fact, is a teaching away from the present invention. Such inward movement towards a burner does nothing to help a user avoid burns that can result from the user placing his hands proximate to side-mounted burners, in prior art rotisseries. In fact, inward movement of a spit, and the resulting movement of the gyros cone to a position closer to the burner, increases the danger of burns to the hands of a user. These prior art rotisseries are thus not as safe as the rotisserie of the present invention.

In the present invention, the rotisserie broiler 12 includes means for simultaneously (a) maintaining the spit 34 in a generally vertical orientation; and (b) moving the entire spit 34 transversely, and towards the open end 28 of the metal housing 14.

This may be seen by a comparison of the FIGURES. In FIGS. 1, 2, and 3, the spit 34 is vertically oriented, and generally confined within the housing 14. This is the cooking position.

Figure 8:
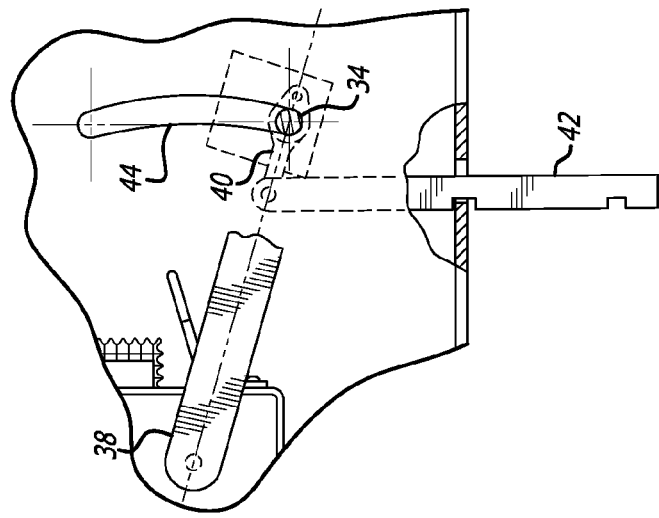
FIG. 8 is a top view of the generally C-shaped mechanism used to transversely move the spit, with the mechanism in the position corresponding to FIG. 3.
Figure 9:
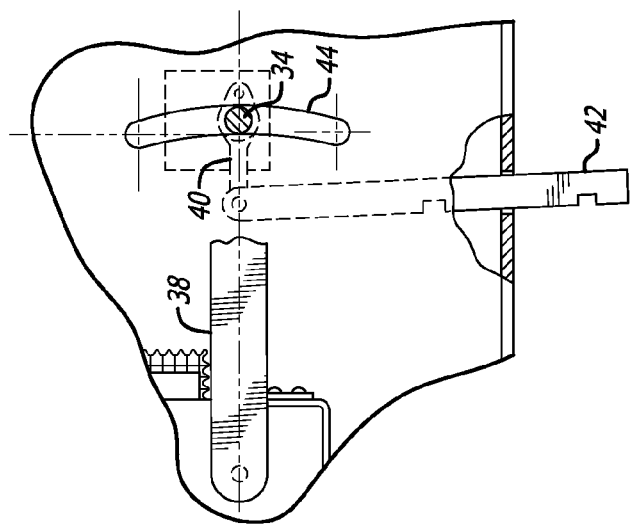
FIG. 9 is a top view of the generally C-shaped mechanism used to transversely move the spit, with the mechanism in the position corresponding to FIG. 6.
Figure 10:
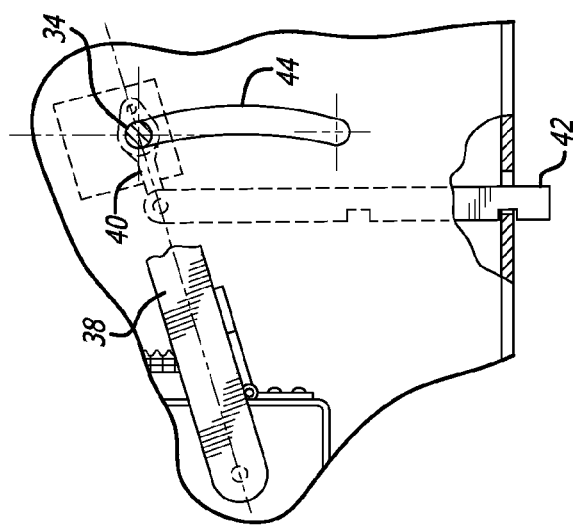
FIG. 10 is a top view of the generally C-shaped mechanism used to transversely move the spit, with the mechanism in the position corresponding to FIG. 5.

In FIGS. 4-6, the spit 34 maintains its vertical orientation. However, both the spit 34 and the entire gyros cone 26 have been moved through the open end 28 of the housing 14. The motion of the gyros cone 26 is demonstrated by the sequential FIGS. 8-10. In FIG. 8, the spit 34 is shown in its position entirely within the housing 14. In FIG. 9, the spit 34 is shown in its intermediate position, i.e., the spit 34 is being moved from its cooking position to its cutting position. In FIG. 10, the spit is shown in that cutting position, i.e., moved through the open end 28.

In each of the positions of FIGS. 8-10, the vertical orientation of the spit 34 is retained. When the spit 34 is in the cutting position of FIGS. 4 and 5, the entire gyros cone 26—and not just the top of the gyros cone 26—is moved significantly farther away from the burners 30 and 32, as compared to the prior art rotisseries. As a result, the potential for burns on the hands of the user is substantially lowered, if not eliminated.

A number of components or structures are provided to effect this kind of transverse, vertically oriented movement of the spit 34.

First, the top and bottom of the spit 34 are indirectly secured to an upper, generally horizontal arm 38 and a lower, generally horizontal arm 40.

As may best be seen in FIG. 1, the lower, generally horizontal arm 40 is secured to a lever 42. As the lever 42 is pulled or pushed, it causes pivotal movement of the lower arm 40. As the lower arm 40 moves, the upper arm 38 also moves. Together, the movement of the upper 38 and lower arm 40 cause transverse movement of the spit 34, from the position of FIGS. 1-3 to the position of FIGS. 4-5.

As noted above, this lever 42 is movable between one of two positions, and effects movement of the spit.

For example, when the lever 42 is in its first, cooking position of FIGS. 1-3, the spit 34 is fully enclosed within the housing 14.

In contrast, when the lever 42 is in its second, cutting position, the spit 34 is moved towards the open end 28 of the housing 14, and most preferably to a position outside of the confines of the housing 14.

As the spit is moved transversely, from the cooking position of FIGS. 1-3 to the cutting position of FIGS. 4-5, it moves along a generally radially extending path, as defined along the floor 22 of the metal housing 14.

The radial movement of the spit 34 arises through movement of the lower end of the spit 34 through an arcuate slot 44 in the floor 22 of the metal housing 14. The spit 34 moves through this slot, and from its first cooking position (FIG. 8), to its intermediate position (FIG. 9), and then finally to its second cutting position (FIG. 10).

In summary, the invention includes a mechanism for moving a spit 34 in a generally transverse direction, while simultaneously maintaining that spit 34 in its generally vertical orientation. This mechanism comprises an upper, generally horizontal arm 38 positioned adjacent the upper end of the spit 34, and a lower, generally horizontal arm 40 positioned adjacent the lower end of the spit 34. When combined with the spit 34, the upper arm 38 and the lower arm form a generally C-shaped mechanism for moving that spit 34.

A lever 42 moves this mechanism from a first, cooking position (FIGS. 1-3), wherein the spit 34 is positioned closely adjacent to heating elements 30 and 32, to a second, cutting position (FIG. 4), wherein the spit 34 is positioned remotely from those heating elements 30 and 32.

While specific embodiments have been illustrated and described, numerous modifications come to mind without significantly departing from the spirit of the invention, and the scope of protection is only limited by the scope of the accompanying Claims.

What is claimed is:

1. A generally vertically disposed rotisserie broiler, said broiler comprising:
   (a) metal housing with side walls, a floor, and an open end;
   (b) at least one burner, disposed on opposite side walls of the housing;
   (c) a generally vertically disposed spit, normally contained within the confines of the metal housing;
   (d) a motor for rotating the spit; and
   (e) means for maintaining the spit in a generally vertical configuration, and for moving the entire spit transversely, and towards the open end of the metal housing, without the use of clamps or fasteners, said means including a lever that is spaced below and positioned away from said burner, and wherein pushing or pulling upon said lever effects said transverse movement of the spit.

2. The rotisserie broiler of claim 1, wherein said spit is moved along a radially outward path, along the floor of the metal housing.

3. The rotisserie broiler of claim 1, comprising two or more burners.

4. The rotisserie broiler of claim 1, comprising three or more burners.

5. The rotisserie broiler of claim 1, wherein the means for moving the spit transversely comprise an upper, generally horizontal arm and a lower, generally horizontal arm.

6. The rotisserie broiler of claim 5, wherein the upper and lower generally horizontal arms are each connected to the spit.

7. The rotisserie broiler of claim 6, wherein said lever is secured to the lower generally horizontal arm.

8. The rotisserie broiler of claim 7, wherein said lever is movable from a first, cooking position wherein the spit is fully enclosed within the housing, to a second, cutting position wherein the spit is moved towards the opening, and wherein the spit is outside of the confines of the housing.

9. The rotisserie broiler of claim 8, further comprising an arcuate slot in the floor of the metal housing, through which the spit moves between its first cooking position and its second cutting position.

10. A generally vertically disposed rotisserie broiler, said broiler comprising:
    (a) metal housing with side walls, a floor, and an open end;
    (b) an arcuate, generally radially extending slot on the floor of the metal housing;
    (c) one or more burners, disposed on opposite side walls of the housing;
    (d) a generally vertically disposed spit, normally contained within the confines of the metal housing;
    (e) a motor for rotating the spit;
    (f) a clampless, upper, generally horizontal arm, and a clampless lower, generally horizontal arm, for cooperatively maintaining the spit in a generally vertical configuration, and for moving the entire spit transversely, and towards the open end of the metal housing; and
    (g) a lever secured to the lower generally horizontal arm, said lever being spaced below and positioned away from said burner, and wherein pushing or pulling upon said lever effects said transverse movement of the spit.

11. The rotisserie broiler of claim 10, wherein the lever is movable from a first, cooking position, wherein the spit is fully enclosed within the housing, to a second, cutting position wherein the spit is moved towards the opening, and wherein the spit is outside of the confines of the housing.

* * * * *